United States Patent [19]

Scott-Scott et al.

[11] Patent Number: 5,085,041
[45] Date of Patent: Feb. 4, 1992

[54] DUAL MODE ENGINE HAVING A CONTINUOUSLY OPERATED OXIDIZER PUMP

[75] Inventors: John L. Scott-Scott, Warwick; Alan Bond, Oxford, both of England

[73] Assignee: Rolls-Royce plc, London, England

[21] Appl. No.: 314,703

[22] Filed: Feb. 17, 1989

[30] Foreign Application Priority Data

Mar. 23, 1988 [GB] United Kingdom ............ 8806895

[51] Int. Cl.$^5$ .................................. F02K 9/78
[52] U.S. Cl. ...................................... 60/244; 60/257
[58] Field of Search ............ 244/59, 62, 53 R; 60/225, 224, 250, 246, 257, 259, 260, 267, 244, 245

[56] References Cited

U.S. PATENT DOCUMENTS

| | | | |
|---|---|---|---|
| 3,237,401 | 3/1966 | Peters et al. | 60/246 |
| 3,261,571 | 7/1966 | Pinnes | 60/224 |
| 3,747,339 | 7/1973 | Wolf et al. | 60/246 |

FOREIGN PATENT DOCUMENTS 1247073 8/1967 Fed. Rep. of Germany ........ 60/224

Primary Examiner—Michael J. Carone
Attorney, Agent, or Firm—Cushman, Darby & Cushman

[57] ABSTRACT

An aerospace propulsor is powered by liquid hydrogen. The hydrogen is passed through a turbine which drives a liquid oxygen pump. During non-atmospheric flight, the liquid oxygen is directed to the propulsor's combustion chamber where it is mixed with the liquid hydrogen and combustion takes place. However during atmospheric flight, the liquid oxygen is pumped to drive a turbine which powers a fan adapted to provide additional pressurization of air entering the engine for combustion.

8 Claims, 1 Drawing Sheet

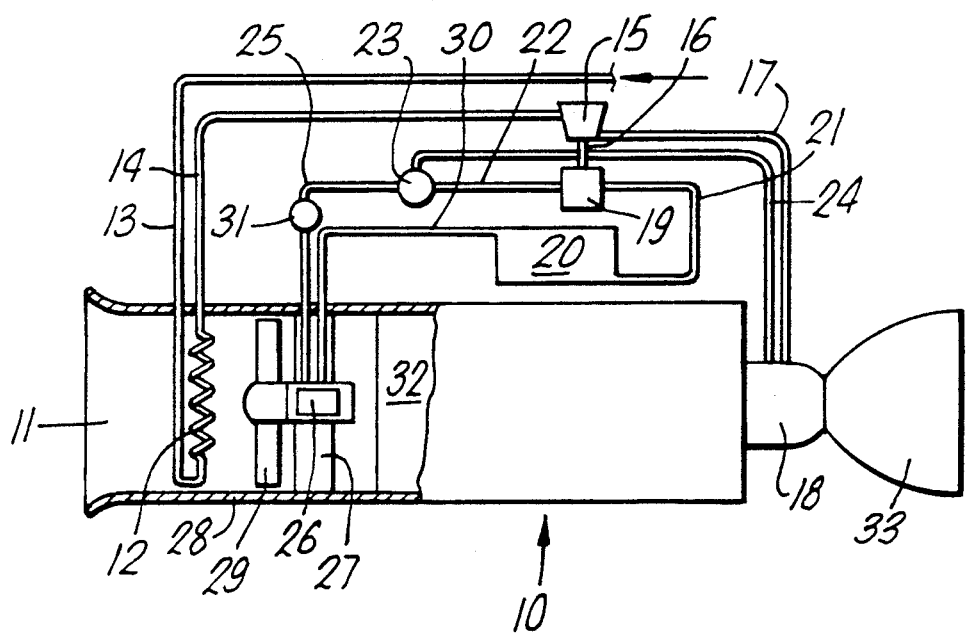

DUAL MODE ENGINE HAVING A CONTINUOUSLY OPERATED OXIDIZER PUMP

This invention relates to aerospace propulsors and has particular reference to aerospace propulsors of the type described in UK patent application No 8430157.

In UK patent application No 8430157 there is described an aerospace propulsor which is adapted to power aerospace vehicles at very high velocities in order to either minimise earth transit time or effect orbital insertion. The propulsor achieves this performance by the provision of a compressor, combustion apparatus and a propulsion nozzle which is arranged t receive the products of combustion and eject them to provide propulsive thrust. The combustion apparatus receives either fuel, such as liquid hydrogen and compressed air from the compressor which has been cooled prior to compression by heat exchange with the hydrogen fuel in liquid form, or fuel and liquid oxidiser via suitable valve means to control the flows of air hydrogen and oxygen. Essentially the propulsor operates using air and liquid hydrogen fuel while it remains in that portion of the atmosphere in which there is an adequate supply of air to meet the propulsor's needs. When the air supply becomes inadequate, the propulsor changes its mode of operation so that liquid oxygen (from an on-board supply thereof) is directed to the combustion apparatus in place of air. Thus while the propulsor operates in that portion of the atmosphere in which an adequate supply of air is present for effective operation, the portion of the propulsor concerned with the liquid oxygen and the pumping thereof is not in use.

It has been found that during certain parts of the flight envelope of the aerospace propulsor in the atmosphere, additional pressurisation of the propulsor's compressor is desirable either to reduce the pressure ratio demand of the compressor, or to permit the compressor to operate at a previously unattainable fixed pressure ratio.

It is an object of the present invention to provide an aerospace propulsor in which such additional pressurisation of the propulsor's compressor is achieved.

According to the present invention, an aerospace propulsor comprises air compression means, combustion apparatus and a propulsion nozzle adapted to receive the products of combustion and thereby provide propulsive thrust, said combustion apparatus being arranged to receive fuel and, in a first mode of engine operation air at least partially compressed by said air compression means, and in a second mode of operation, liquid oxidiser pumped thereto by pump means from a liquid oxidiser reservoir, said air compression means being powered by turbine means hydraulically driven by liquid oxidiser pumped from said reservoir by said pump means, said pump means being operative during both of said modes of engine operation.

The invention will now be described, by way of example, with reference to the accompanying drawing which is a schematic, partially sectioned side view of an aerospace propulsor in accordance with the present invention.

With reference to the drawing, an aerospace propulsor generally indicated at 10 comprises an air intake 11 in which is situated a heat exchanger 12. The heat exchanger 12 is fed with liquid hydrogen through a delivery pipe 13. The liquid hydrogen serves to reduce the temperature of the air entering the engine to a level which is thermodynamically desirable for effective propulsor operation. The hydrogen is then exhausted from the heat exchanger 12 via a further pipe 14 to a turbine 15. The hydrogen expands through the turbine 15, causing it to rotate a drive shaft 16 before being exhausted through a further pipe 17. The pipe 17 in turn directs the hydrogen to the combustion chamber 18 of the propulsor 10.

The turbine driveshaft 16 drives a pump 19 which serves to pump liquid oxygen from a storage tank 20 through a pipe 21. The pumped liquid oxygen is then directed through a pipe 22 to a diverter valve 23 which directs the liquid oxygen either through a pipe 24 to the propulsor combustion chamber 18, or through a pipe 25 to a turbine 26.

The liquid oxygen driven turbine 26 is located downstream of the propulsor intake 11 by a plurality of stator vanes 27 which extend radially inwardly from the propulsor casing 28. The turbine 26 drives a fan 29 which serves to pressurise air which has entered the propulsor 10 through its air intake 11. The speed at which the fan 29 is driven is governed by a variable valve 31 provided in the pipe 25. It will be appreciated however that alternatively fan 29 speed variation could be achieved by variation in the speed of the liquid oxygen pump 19.

Liquid oxygen is exhausted from the turbine 26 via a pipe 30 which serves to return the liquid oxygen to the storage tank 20 for further use. Means (not shown) are preferably provided in the storage tank 20 for allowing the boil-off or separation of gaseous oxygen. This is because heat energy is imparted to the liquid oxygen by its passage through the turbine 26. Therefore for a constant pressure within the tank 20, some degree of boil-off of the liquid oxygen returned to the tank 20 is allowed for, thereby preventing unacceptable rises in bulk temperature of the liquid oxygen stored within the tank 20.

When the propulsor 10 is operating in the atmosphere, the diverter valve 23 is so arranged that liquid oxygen is pumped by the pump 19 to the turbine 26, so that the fan 29 is driven thereby to provide air pressurisation. Air cooled by the heat exchanger 12 and which has been pressurised by the fan 29 is then directed by the stator vanes 27 into an axial flow compressor, part of which is shown at 32, which serves to further pressurise the air. The pressurised air is then directed into the combustion chamber 18 where it is mixed with hydrogen delivered through the pipe 17 and combustion takes place. The resultant combustion products then expand through a nozzle 33 downstream of the combustion chamber 18 to provide propulsive thrust.

When the propulsor 10 is operating out of the atmosphere, the diverter valve 23 is arranged so that liquid oxygen, instead of pumped by the pump 19 to the turbine 26, is pumped through the pipe 24 to the combustion chamber 18. There it is mixed with hydrogen supplied through the pipe 17 and combustion takes place. Then, as is the case during atmospheric operation, the combustion products expand through the nozzle 33 to provide propulsive thrust.

It will be seen therefore that the liquid oxygen pump 19 operates continuously during propulsor operation to either drive the fan 29 or supply oxygen to the combustion chamber 18.

The fan 29, which may of course comprise more than one stage if necessary, is therefore driven in a manner which obviates its mechanical connection with other parts of the propulsor 10. Moreover a gearbox is not necessary to drive the fan 29. Thus a lightweight fan mechanism is achieved.

Although the present invention has been described with reference to the use of liquid oxygen, it will be appreciated that other suitable liquid oxidisers could be used if so desired.

The fan 29 therefore provides air pressurisation in the propulsor 10 which is additional to that provided by the compressor 32. Consequently the pressure ratio demand of the compressor 32 is reduced. Alternatively the compressor 32 could, by virtue of the provision of the fan 29, be allowed to operate at a fixed pressure ratio at values which would have be unattainable by the compressor 32 alone.

We claim:

1. An aerospace propulsor comprising air compression means, combustion apparatus, and a propulsion nozzle adapted to receive the products of combustion and thereby provide propulsive thrust, said combustion apparatus being arranged to receive fuel and, in a first mode of engine operation, air at least partially compressed by said air compression means, said propulsor additionally comprising a liquid oxidiser reservoir and pump means so that in a second mode of operation, liquid oxidiser is pumped to said combustion apparatus by said pump means from said liquid oxidiser reservoir, turbine means being provided to power said air compression means, said turbine means being hydraulically driven by liquid oxidiser pumped from said reservoir by said pump means, said pump means being operative during both of said modes of engine operation.

2. An aerospace propulsor as claimed in claim 1 wherein said fuel, prior to being directed to said combustion apparatus, is directed to drive a turbine, said turbine in turn powering said liquid oxidiser pump.

3. An aerospace propulsor as claimed in claim 2 wherein said fuel is placed in heat exchange relationship with said air which is subsequently at least partially compressed by said compression means.

4. An aerospace propulsor as claimed in claim 1 wherein said fuel is liquid hydrogen.

5. An aerospace propulsor as claimed in claim 1 wherein the operational speed of said air compression means is controlled by variation of the flow rate of said liquid oxidiser pumped to said turbine hydraulically driven thereby.

6. An aerospace propulsor as claimed in claim 1 wherein further air compression means not powered by said hydraulically driven turbine are provided downstream of said air compression means.

7. An aerospace propulsor as claimed in claim 6 wherein said air compression means powered by said hydraulically driven turbine comprises a single stage fan.

8. An aerospace propulsor as claimed in claim 1 wherein said liquid oxidiser is liquid oxygen.

* * * * *